(12) United States Patent
Denis et al.

(10) Patent No.: US 7,247,698 B2
(45) Date of Patent: Jul. 24, 2007

(54) METHODS FOR MAKING POLYETHYLENE TEREPHTHALATE (PET) PREFORMS AND CONTAINERS SUCH AS FOOD BOTTLES, CONTAINERS AND INTERMEDIATE PREFORMS OBTAINED

(75) Inventors: Gérard Denis, Reims (FR); Murielle Vigny, Vittel (FR); Gérard Perez, Sainte-Foy-les-Lyon (FR); Jean-Luc Lepage, Francheville (FR)

(73) Assignee: Nestle Waters Management & Technology, Issy-les-Moulineaux (FR)

( * ) Notice: Subject to any disclaimer, the term of this patent is extended or adjusted under 35 U.S.C. 154(b) by 0 days.

(21) Appl. No.: 10/485,551

(22) PCT Filed: Jul. 30, 2002

(86) PCT No.: PCT/FR02/02748

§ 371 (c)(1),
(2), (4) Date: Jun. 7, 2004

(87) PCT Pub. No.: WO03/011549

PCT Pub. Date: Feb. 13, 2003

(65) Prior Publication Data

US 2004/0214981 A1    Oct. 28, 2004

(30) Foreign Application Priority Data

Jul. 31, 2001    (FR) .................................. 01 10280

(51) Int. Cl.
*C08G 63/02*    (2006.01)

(52) U.S. Cl. ........................ 528/272; 215/11.1; 215/46; 264/176.1; 264/219; 428/35.7; 528/271

(58) Field of Classification Search ............... 215/11.1, 215/46; 264/176.1, 219; 428/35.7; 528/271, 528/272

See application file for complete search history.

(56) References Cited

U.S. PATENT DOCUMENTS

| | | | |
|---|---|---|---|
| 4,254,080 A | | 3/1981 | Agrawal |
| 4,340,721 A | * | 7/1982 | Bonnebat et al. ........... 528/272 |
| 5,239,016 A | * | 8/1993 | Cochran et al. ............ 525/371 |
| 5,239,045 A | * | 8/1993 | Hirahara et al. ............ 528/272 |
| 5,641,548 A | | 6/1997 | Yamamoto et al. |
| 5,939,516 A | * | 8/1999 | Greaves et al. ............. 528/302 |
| 2002/0048682 A1 | * | 4/2002 | Subramanian et al. ...... 428/523 |

FOREIGN PATENT DOCUMENTS

| CL | 41.350 | 6/1996 |
|---|---|---|
| EP | 0 368 278 | 5/1990 |
| EP | 0 492 999 | 7/1992 |

* cited by examiner

*Primary Examiner*—Terressa Boykin
(74) *Attorney, Agent, or Firm*—Young & Thompson

(57) ABSTRACT

The invention concerns the field of manufacture of PET containers designed in particular for packaging food products, particularly bottles for aerated beverages such as in particular natural and mineral water. The method for manufacturing PET resin preforms and the resulting preforms, a method for making PET resin containers from the preforms and the manufactured containers, in particular food bottles made of PET resin. The method for making PET resin preforms is characterised in that it consists in using a PET resin having an intrinsic viscosity (IV) less than 0.65 dl/g.

20 Claims, No Drawings

METHODS FOR MAKING POLYETHYLENE TEREPHTHALATE (PET) PREFORMS AND CONTAINERS SUCH AS FOOD BOTTLES, CONTAINERS AND INTERMEDIATE PREFORMS OBTAINED

The present invention relates to the field of synthetic materials, commonly called plastics materials, and to the transformation thereof for the production of outer or inner packaging products. The invention relates in particular to the field of production of polyester containers intended for food use, such as bottles, in particular bottles intended to contain water.

Polyesters, and in particular polyethylene terephthalate (PET) and the copolymers thereof, are well known for the production of all types of outer or inner packaging material such as bottles, drums, boxes, films, bags, etc.

In particular in the food field, PET and its derivatives are widely used in the production of bottles, in particular bottles intended to contain still or carbonated water, fruit juices, etc.

At present, the PET polymers used in the production of bottles for food use have properties in use, in particular a so-called "barrier" effect to the various gases (water vapour, oxygen, carbon dioxide, etc.) which increase with the intrinsic viscosity (IV) of the material used, in other words with the chain length of the polymers used.

Therefore, materials having good properties of impermeability to gas are generally viscous (IV between 0.72 dl/g and 0.83 dl/g) and therefore difficult to use industrially and expensive to produce and use. Furthermore, relatively large quantities of acetaldehyde are formed during transformation of these materials, and this is an additional problem if the bottles are intended to contain certain drinks, for example mineral water. In fact, even minute amounts of acetaldehyde (of about 20 ppm) in the material forming the bottle are sufficient to give the drinks contained therein an undesirable fruity taste.

Furthermore, existing processes for producing highly polymerised PET involve the presence of a solid state polymerisation or post-condensation (PCS or SSP) stage, making the process more expensive and more complicated.

Various solutions have already been considered and some have been employed in an attempt to overcome the problems encountered.

The problem posed by the present invention consequently involves overcoming the aforementioned drawbacks and proposing a process for producing PET preforms and containers which does not necessitate an SSP stage but allows the obtaining of containers having physical and chemical properties which meet present and future requirements.

The present invention relates to a first process for producing PET resin preforms and to the preforms obtained by carrying out said process.

In fact, in the field of container production, the synthetic resins used are normally transformed by injection and moulding into preforms, in other words into substantially tubular hollow bodies (possibly provided with bottle necks at their open ends) and are then blown or bi-drawn during production of the actual container.

The present invention also relates to a second process for producing PET resin containers such as bottles for food use, from the aforementioned preforms and to the resultant PET containers.

Finally, the present invention also relates to a PET container, in particular a food container, in particular a food bottle, preferably a food bottle intended to contain water and to a third process for producing PET containers which combines the above-mentioned separate first and second processes.

The process for producing PET resin preforms according to the invention is characterised in that it involves using a PET resin having the intrinsic viscosity (IV) lower than 0.65 dl/g.

The preform to be obtained by carrying out this first process is characterised in that the intrinsic viscosity (IV) of the polyester forming the walls of said preform is between 0.45 dl/g and 0.65 dl/g.

The second process for producing PET resin containers, such as bottles for food use, from a preform according to the invention or obtained by carrying out the first process according to the invention is characterised in that it essentially comprises the stages involving:
  introducing the preform into a blowing or bi-drawing installation,
  heating the preform,
  preblowing the heated preform by injecting a gas under pressure at a first pressure for a first period,
  blowing the preform, which has been preblown by injection of a gas under pressure, at a second, higher pressure for a second period,
  ejecting the container obtained.

The third process for producing PET containers according to the invention, in particular food bottles, is characterised in that it essentially comprises the stages involving:
  producing a preform from said PET resin by carrying out the first process according to the invention and/or using a preform according to the invention and
  producing said container, from the previously obtained preform, by carrying out the second process according to the invention.

The PET container obtained from a preform according to the present invention or obtainable by carrying out the above-mentioned second process is characterised in that the intrinsic viscosity (IV) of the polyester forming the walls of said container is between 0.45 dl/g and 0.65 dl/g.

The invention will be understood better by means of the following description which relates to a preferred embodiment given as a non-limiting example.

The process for producing PET resin preforms according to the invention is characterised in that it involves using a polyester resin having an intrinsic viscosity (IV) lower than 0.65 dl/g. The term "lower than 0.65 dl/g" means strictly lower than 0.65 dl/g.

Advantageously, the intrinsic viscosity (IV) is between 0.45 dl/g and 0.65 dl/g.

The term intrinsic viscosity (IV) means the viscosity of a polymer solution at zero concentration. This value is calculated by formula (I) below by determining a viscosity index (VI) in dl/g measured on a polymer solution containing 0.5 g of polymer/100 ml of a solvent consisting of orthodichlorobenzene and phenol (50/50 by weight) at 25° C. in accordance with the standard ISO 1628/5 dated 15 Jun. 1986. For the polyesters of the invention, the intrinsic viscosity (IV) in dl/g is calculated by the following formula (I):

$$IV = -10^{-1}VI^2 + 0.94VI + 0.0122 \qquad (I)$$

The process according to the present invention enables the PCS or SSP stage present in known processes and, in particular, used to increase the intrinsic viscosity (IV), to be eliminated. This elimination allows significant savings in energy, in equipment and in time, since the solid state post-condensation stage generally takes place at more than 200° C. under a nitrogen stream and can last for 10 hours to 30 hours.

The present invention allows not only gains in productivity and significant savings in materials on an industrial scale but also the obtaining of a final product having technical characteristics equivalent, or even superior to, those of existing products, as demonstrated hereinafter.

PET resins suitable for carrying out the process according to the invention include polyethylene terephthalate polyesters (PET), in other words saturated thermoplastic polyesters of which the generic name covers a whole family of more or less copolymerised polymers.

The preferred monomers are terephthalic acid and ethylene glycol, which lead to polyethylene terephthalate, better known by the abbreviation PET, as mentioned hereinbefore.

In the present document, the term PET also covers a homopolymer obtained merely from monomers of terephthalic acids or their esters such as dimethylterephthalate and ethylene glycol monomers as well as copolymers containing at least 92.5% in number of recurring ethylene terephthalate units.

According to a characteristic of the invention, the polyester contains at least one crystallisation retarder for slowing down or delaying crystallisation of the polyester, in particular during cooling of the moulded or injected article such as a preform, in order to obtain crystallisation into very small crystals, while avoiding spherolitic crystallisation, and to be able to produce a transparent article of which the walls do not exhibit haze, with acceptable mechanical properties.

These crystallisation retarders are difunctional compounds such as diacids and/or diols added to the mixture of monomers before or during polymerisation of the polyester.

Examples of diacids suitable as crystallisation retarders include isophthalic acid, naphthalene dicarboxylic acid, cyclohexane dicarboxylic acid, cyclohexane diacetic acid, succinic acid, glutaric acid, adipic acid, azelaic acid and sebacic acid and examples of suitable diols include aliphatic diols containing 3 to 20 carbon atoms, cycloaliphatic diols containing 6 to 20 carbon atoms, aromatic diols containing 6 to 14 carbon atoms and mixtures thereof such as diethylene glycol, triethylene glycol, the isomers of 1,4-cyclohexane di-methanol, 1,3-propane diol, 1,4-butane diol, 1,5-pentane diol, 3-methylpentanediol-2,4, 2-methylpentanediol-1,4, 2,2,4-trimethylpentanediol-1,3, 2-ethylhexanediol-1,3, 2,2-diethylpropanediol-1,3, 1,3-hexanediol, 1,4-di(hydroxyethoxy)benzene, 2,2-bis(4-hydroxycyclohexyl)-propane, 2,4-dihydroxy-1,1,3,3-tetramethylcyclobutane, 2,2-bis(3-hydroxyethoxypenyl)propane, 2,2-bis(4-hydroxypropoxyphenyl)propane and mixtures thereof.

Diethylene glycol is often inherently present in the polyesters because it forms during synthesis by condensation of two ethylene glycol molecules.

Depending on the desired concentration of recurring units containing a diethylene glycol (DEG) radical in the final polyester, diethylene glycol is added to the monomer mixtures or the conditions for synthesis of the polyester are controlled to limit the formation of diethylene glycol.

Advantageously, the molar concentration of diethylene glycol in the polyester relative to the numbers of moles of diacid monomers is lower than 3.5 mol %, preferably lower than 2 mol %.

With regard to other crystallisation retarders, the molar concentration based on the number of moles of all diacids in the monomer mixture and therefore in the polyester obtained is advantageously lower than 7.5%, providing that the DEG content is deducted from this value if it is present. In other words, the total molar concentration of crystallisation retarder should be lower than 7.5%, as mentioned in European patent 41035.

The polyester can obviously contain a mixture of crystallisation retarders of the acid and/or diol type.

If the preform injection-moulding process and hollow container-blowing process allow the cooling rates, in particular, to be controlled to avoid spherolitic crystallisation of the resin or if the bottles to be produced will not be translucent such as milk bottles, for example, the total concentration of crystallisation retarder may be very low, for example approx. at 1% or even zero, apart from the DEG formed during synthesis of the polyester.

According to a preferred embodiment of the invention, the polyester of the invention advantageously contains less than 4% of isophthalic acid and less than 4% of diethylene glycol, the content being expressed in mol % of crystallisation retarder based on the number of moles in all the diacid monomers. According to a preferred embodiment, said polyester does not contain a crystallisation retarder but, nevertheless, it contains DEG originating from the production of said polyester.

The major stages of synthesis of such a resin are as follows. Firstly, "blending", in other words mixing of the diacids in powder form with the liquid glycols, is carried out. The mixture is then esterified in the conventional manner by heating and simultaneous extraction of the water formed. Actual polymerisation is carried out by heating the reaction mixture under vacuum at a temperature between about 260° C. and 280° C. while extracting glycol, wherein said polymerisation may be preceded by a first stage of prepolymerisation under similar conditions. The reaction is stopped when a viscous mixture having an appearance of honey or molasses is obtained.

This viscous mixture may then be passed into a rod die known per se. The rods obtained are then plunged into a tank of cooling water and then cut in a granulator to obtain small solid granules, for example in the form of cubes having sides of 2 mm to 3 mm. The PET resin granules obtained are amorphous and transparent.

To enable the previously synthesised resin to be used in industrial applications, it may also be necessary to crystallise it.

For this purpose, the present invention proposes a process for spherolitic crystallisation of the PET resin which is characterised in that it involves heating the resin to a temperature of between 120° C. and 200° C.

According to a particularly appropriate variation, spherolitic crystallisation is carried out with stirring to prevent the granules from sticking together. The transparent sticky amorphous granules are thus transformed into opaque white crystalised granules (milky appearance) which do not stick together and have an intrinsic viscosity (IV) lower than 0.65 dl/g, preferably between 0.45 dl/g and 0.65 dl/g.

Preferably, spherolitic crystallisation is carried out in a fluidised bed. This ensures better heat exchange and also minimises the phenomena of adhesion between the grains.

The first process according to the invention is also characterised in that it essentially comprises the following stages:

drying the resin,
melting the resin by heating in a plasticization extruder cylinder equipped in particular with an endless screw,
transferring the molten resin from the extruder cylinder to a hot distributor or block equipped with at least one nozzle and at least one heated stopper, injecting the moulds and resin into at least one mould of the preform to be obtained, compensating shrinkage of the injected material by additional injection of molten resin as the preform is formed in the mould or moulds during cooling of the injected resin, and ejecting the resultant preform from the mould or moulds and leaving it to cool externally.

As a non-limiting example, drying may be carried out by passing the granules in a hot (about 175° C.) dry (dew point lower than 35° C.) air stream for a period which generally varies between 4 hours and 6 hours.

According to a characteristic of the invention, drying is carried out until a residual water content lower than 20 ppm is obtained.

According to a further characteristic, heating is carried out at a temperature between 275° C. and 285° C. This allows the resin, of which the fusion point is approx. 245° C. to 255° C., to melt. It is important not to exceed this temperature in order to limit the production of decomposition products such as acetaldehyde.

Plasticization/fusion takes place in an extruder cylinder regulated to a temperature of about 280° C. in which an endless screw with a constant pitch or a leakage thread rotates. The endless screw has a compression ratio, in other words a ratio between the cross-sectional area of the screw inlet and the cross-sectional area of the screw outlet, which is between 2.5 and 3, preferably about 2.7.

This prevents, or at least minimises, the penetration into the molten polymer mixture of external air bubbles capable of forming cavities in the final extruded or moulded product. This range also minimises shearing phenomena which result in local heating which may exceed 300° C. and consequently generates decomposition products including acetaldehyde.

The preform obtained is also characterised in that it is composed of material having crystallinity or a crystallinity content lower than 10%, preferably lower than 5%, and good transparency, similar to the characteristics of crystallinity and transparency of the preforms obtained with polyesters having an intrinsic viscosity higher than 0.65 dl/g.

A nonreturn valve is fixed to the end of said endless screw and, in certain cases, a rear jack may be provided to allow the screw to retract when it plasticizes and to advance when molten material is injected or transferred.

A conventional hot block is used to transfer the molten material. According to a further characteristic, the nozzle or nozzles and the stopper or stoppers are heated to a temperature of between 260° C. and 275° C.

The process for producing the preform is also characterised in that the pressure for injecting the molten resin into the mould or moulds is between $2.5.10^7$ Pa (250 bars) and $5.10^7$ Pa (500 bars) at a temperature between 260° C. and 275° C. These low temperature and pressure values minimise acetaldehyde production.

The pressure values are about half those used in a conventional process employing a resin with a high (IV), in other words of about 0.72 dl/g to 0.83 dl/g or higher. This also results in significant savings at this level with regard to the installations required or the maintenance thereof and to the energy consumption.

With regard to the cooling stage, it has been found to be particularly advantageous to cool the mould or moulds to a temperature of between 0° C. and 10° C. This may be carried out using any cooling processes and devices available to a person skilled in the art.

The period commonly known as "holding period" for compensating the shrinkage of the plastics material which is solidified by injection of additional plastics material at constant pressure lasts about 6 seconds.

The PET resin preform obtained by carrying out the above-mentioned process is carried out in that the intrinsic viscosity (IV) of the polyester forming the walls of said preform is between 0.45 dl/g and 0.65 dl/g.

The present invention also relates to a process for producing PET resin containers such as bottles for food use, from a preform according to the present invention or obtained by carrying out the first process according to the invention, characterised in that it comprises the stages involving:

introducing the preform into a blowing or bi-drawing installation comprising, in particular, a heating device, heating the preform, preblowing the heated preform by injecting a gas under pressure at a first pressure for a first period, blowing the preform, which has been preblown by injection of a gas under pressure, at a second, higher pressure for a second period, ejecting the container obtained.

The blowing or bi-drawing installation may be selected from among installations commonly used for this type of application. As a non-limiting example, this installation can essentially comprise a preform feeder produced, for example, in the form of guide rails along which the preforms are supplied, a heat conditioning device for said preforms such as an assembly of radiant elements, at least one metal mould for axle blowing or bi-drawing by injection of a suitable gas such as compressed air and a device for ejection of the blown product or products obtained.

Advantageously, the heating temperature for the preform is between 80° C. and 100° C. and this corresponds to a saving of about 20° C. over a conventional preform. As mentioned, this heating may be carried out by any suitable means and preferably by a chamber or an oven equipped with a set of short infrared radiation lamps directed toward the external surfaces of the preforms to be heated. The above-mentioned temperatures are those measured at the outlet of the oven and correspond to an average, longitudinal temperature gradients being desired on the walls of the heated preforms.

Preblowing of the preform takes place at a first temperature of between $1.10^5$ Pa and $10.10^5$ Pa (1 bar and 10 bars) for a first period of between 0.15 and 0.6 seconds.

Blowing of the preblown preform takes place at a second pressure of between $3.10^6$ Pa and $4.10^6$ Pa (30 bars and 40 bars) for a second period of between 0.8 second and 2 seconds. In a known manner, a drawing rod may also be introduced into the preform during the preblowing and/or blowing operations to initiate said operations and to check the perfect conduct thereof.

The invention also relates to a PET container which is characterised in that it is composed of a resin having an intrinsic viscosity lower than 0.65 dl/g.

The invention also relates to a PET container obtained from a preform according to the invention or obtainable by carrying out the above-described second process which is characterised in that the intrinsic viscosity (IV) of the polyester forming the walls of said container is between 0.45 dl/g and 0.65 dl/g.

Advantageously, said container is also characterised in that the density of the polyester forming the walls of said container is between 1.36 and 1.37.

According to a further characteristic, the average crystallinity of the polyester forming the walls of said container is between 25% and 35%.

The container according to the invention can have any of the shapes and sizes normally encountered in the industry.

The container according to the invention is also characterised in that its permeability to carbon dioxide is at least 5% better than that of a container obtained with a PET resin having an intrinsic viscosity (IV) higher than or equal to 0.65 dl/g.

The permeabilities given as examples in the table of the present description are measured by a test carried out on a "Mocon Permatran C4/40". In this test, samples of bottles are prepared in duplicate. The samples are prepared in accordance with a precise programme, staggered 2 by 2, so as to have the same $CO_2$ saturation time. The bottles are carbonated by the conventional method of chemical carbonation.

The actual test is carried out in the following manner:

In a first stage, all the cells are in so-called "idle" mode (without activity). If no chamber is connected, the cells are dismantled and the nitrogen inlets and outlets are fixed in a similar manner. If the nitrogen inlet is connected to the top of chamber A, the operation is repeated for chamber B. The connectors are then greased and are gripped by hand for a quarter turn. The bottles to be tested are then placed in said chambers and the joints located on the hood of each chamber are greased prior to closure.

The carbon dioxide inlet and outlet has to be blocked on one cell. A $CO_2$ bridge has to be made for the other cell so that the $CO_2$ can circulate to the reference component. A flexible hose greased at each end is used for this purpose.

Then, the various items of information relating to the test to be carried out are collected in the workstation of the measuring apparatus.

In the case of very high barrier values at which the equilibrium value is difficult to evaluate, it is advisable to carry out a preliminary convergence test.

The corresponding calibration is then loaded and the flow rates are fixed. The actual test may therefore begin until the recorded measurements are obtained and displayed or stored. The test conditions employed in the scope of the present invention are as follows:

| | |
|---|---|
| Saturation time: | 10 days |
| Nitrogen flow rate: | 150 cm³ standards per minute |
| $CO_2$ flow rate: | 300 cm³ standards per minute |

The invention also relates to a third process for producing PET containers according to the invention, in particular food bottles, which is characterised in that it essentially comprises the stages involving:
  producing a preform from a PET resin by carrying out the first process according to the invention and/or using a preform according to the invention, and
  producing said container from the previously obtained preform by carrying out the second process according to the invention.

Finally, the present invention also relates to a PET food container, in particular a food bottle, preferably a food bottle intended to contain water which is obtained, if applicable, by the aforementioned production processes.

Non-limiting examples of water or aqueous liquids contained in said container or said bottle may be still or carbonated water, mineral water, spring water, treated water (purified, sterilised, supplemented with minerals, flavoured, etc.), carbonated drinks ("sodas"), fruit juices, milk and the like.

Further detailed advantages of the invention will emerge from the examples given for information in the following comparative table. Copolymer 1 is a copolymer according to the prior art whereas copolymers 2 to 6 are used according to the present invention.

These polyesters were used to produce a 50 cl bottle by the following process:

The polyester granules are melted in an endless single-start screw with a sheath temperature of 285° C. The molten polyester is fed into a preform injector marketed under the name "HUSKY 48 preform machine with XL 300 cavities" with an injection-moulding temperature of between 262° C. and 266° C. and a pressure of 450 bars. The preforms are cooled by circulating water to a temperature of 8.5° C. The total cycle time for injection-moulding is 15.7 s. After the preforms have been cooled, they are fed to a blowing installation for producing bottles having a capacity of 0.5 l and having a neck in the shape designated by the standardised name 28 PCO and a base of petaloid shape with 5 petals. This installation is marketed under the name "SIDEL SBO 1 F2 Lab". The preforms are heated to the temperature shown in the table below. Pre-blowing is carried out for 0.19 s at a blowing pressure of 8.5 bars. Blowing is carried out for 1.78 s at a blowing pressure of 38 bars. The speed of the drawing tube is 1.2 m/s.

The characteristics of the bottles obtained and of the blowing process are shown in the table below for each PET polyester used.

| Polyesters Properties investigated | 1 Comparative | 2 | 3 | 4 | 5 | 6 |
|---|---|---|---|---|---|---|
| Intrinsic viscosity (dl/g) | 0.66 | 0.57 | 0.57 | 0.64 | 0.54 | 0.44 |
| Isophthalic acid (wt. %) | 2.3 | 2.3 | 0 | 0 | 0 | 0 |
| Diethylene glycol (wt. %) | 1.3 | 1.4 | 2.0 | 2.15 | 2.05 | 2.05 |
| $CO_2$ permeability (Mocon) (cm³/bottle · day) | 4.32 | 4.24 | 4.64 | 4.48 | 4.06 | 4.56 |
| Free blow volume (ml) | 1201.46 | 1423.74 | 972.30 | 1146.63 | 1176.91 | 1168.57 |
| Preform temperature (° C.) | 96 | 94 | 89 | 89 | 87 | 83 |
| Bursting pressure (bars) | 15.68 | 13.44 | 13.84 | 14.18 | 13.84 | 10.64 |
| Transverse Young modulus (kPa) | 96.27 | 73.21 | 66.68 | 77.06 | 72.95 | 59.90 |
| Compressive force (daN) | 21.97 | 21.1 | 19.62 | 20.99 | 19.72 | 19.77 |
| deflection (mm) | 1.84 | 1.72 | 1.64 | 1.74 | 1.74 | 1.68 |

The viscosities for the polyesters forming the walls of the bottles are approximately the same as those of the polyesters used.

The invention is obviously not limited to the embodiment described. Modifications are possible, in particular with regard to the constitution of the various elements or by substitution of technical equivalents without departing from the scope of protection of the invention.

The invention claimed is:

1. A PET resin obtained from dihydroxy monomers and aromatic diacid monomers with the exception of naphthalene dicarboxylic acid, and having an intrinsic viscosity (IV) less than 0.65 dl/g, but between 0.45 dl/g and 0.65 dl/g.

2. A method for producing a container, comprising forming a PET resin preform according to claim 1 and forming containers produced from said PET resin preform, wherein forming said PET resin preform does not necessitate solid state polymerisation.

3. The method according to claim 2, wherein the intrinsic viscosity (IV) of said container is less than 0.65 dl/g, but between 0.45 dl/g and 0.65 dl/g.

4. A method for producing a container, comprising forming a PET resin preform according to claim 1, wherein said preform is composed of a material having crystallinity lower than 10%, wherein forming said PET resin preform does not necessitate solid state polymerisation.

5. A PET resin container, comprising a PET resin having an intrinsic viscosity lower than 0.65 dl/g.

6. The container according to claim 5, wherein the intrinsic viscosity (IV) of the resin is between 0.45 dl/g and 0.65 dl/g.

7. The container according to claim 5, wherein the density of the polyester forming the walls of said container is between 1.36 and 1.37 and the intrinsic viscosity of the polyester forming the walls of the container is between 0.45 dl/g and 0.65 dl/g.

8. The container according to claim 5, wherein the mean crystallinity of the polyester forming the walls of said container is between 25% and 35%.

9. The container according to claim 5, wherein said container has a permeability to carbon dioxide that is at least 5% better than that of a second container obtained with a PET resin having an intrinsic viscosity (IV) higher than or equal to 0.65 dl/g.

10. A food container according to claim 5.

11. A polyethylene terephthalate (PET) resin, obtained from monomers of terephthalic acid or terephthalic acid esters and ethylene glycol monomers as well as copolymers having at least 92.5% in number of recurring ethylene terephthalate, having an intrinsic viscosity (IV) lower than 0.65 dl/g.

12. The PET resin according to claim 11, wherein the intrinsic viscosity (IV) is between 0.45 dl/g and 0.65 dl/g.

13. The PET resin according to claim 11, wherein the PET resin contains least one crystallization retarder selected from the group consisting of isophthalic acid, cyclohexane dicarboxylic acid, cyclohexane diacetic acid, succinic acid, glutaric acid, adipic acid, azelaic acid, sebacic acid, aliphatic diols containing 3 to 20 carbon atoms, cycloaliphatic diols containing 6 to 20 carbon atoms, aromatic diols containing 6 to 14 carbon atoms, diethylene glycol, triethylene glycol, the isomers of 1,4cyclohexane di-methanol, 1,3-propane diol, 1,4-butane diol, 1,5-pentane diol, 3-methylpentanediol-2,4, 2-methylpentanediol-1,4, 2,2,4-trimethylpentanediol-1, 3, 2-ethylhexanediol-1,3, 2,2-diethylpropanediol-1,3, 1,3-hexanediol, 1,4-di(hydroxyethoxy)benzene, 2, 2-bis(4-hydroxycyclohexyl)-propane, 2,4-dihydroxy-1,1,3,3-tetramethylcyclobutane, 2,2-bis(3-hydroxyethoxypenyl) propane, 2,2-bis(4hydroxypropoxy -phenyl)propane, and mixtures thereof.

14. A PET resin preform comprising a PET resin according to claim 11.

15. PET resin container formed from a PET resin preform according to claim 14.

16. The container according to claim 15, wherein the intrinsic viscosity (IV) of the walls of said container is between 0.45 dl/g and 0.65 dl/g.

17. The container according to claim 15, wherein the density of the polyester forming the walls of said container is between 1.36 and 1.37.

18. The container according to claim 15, wherein the mean crystallinity of the polyester forming the walls of said container is between 25% and 35%.

19. The container according to claim 15, wherein said container has a permeability to carbon dioxide that is at least 5% better than that of a second container obtained with a PET resin having an intrinsic viscosity (IV) higher than or equal to 0.65 dl/g.

20. A method for producing the container according to claim 15, comprising
introducing said preform into a blowing or bi-drawing installation;
heating said preform;
preblowing said heated preform by injecting a gas under pressure at a first pressure for a first period;
blowing said preform, which has been blown by injection of a gas under pressure, at a second, higher pressure for a second period; and
ejecting the obtained container, wherein forming said PET resin does not necessitate solid state polymerization prior to said introducing said preform step.

* * * * *